Figure 1:
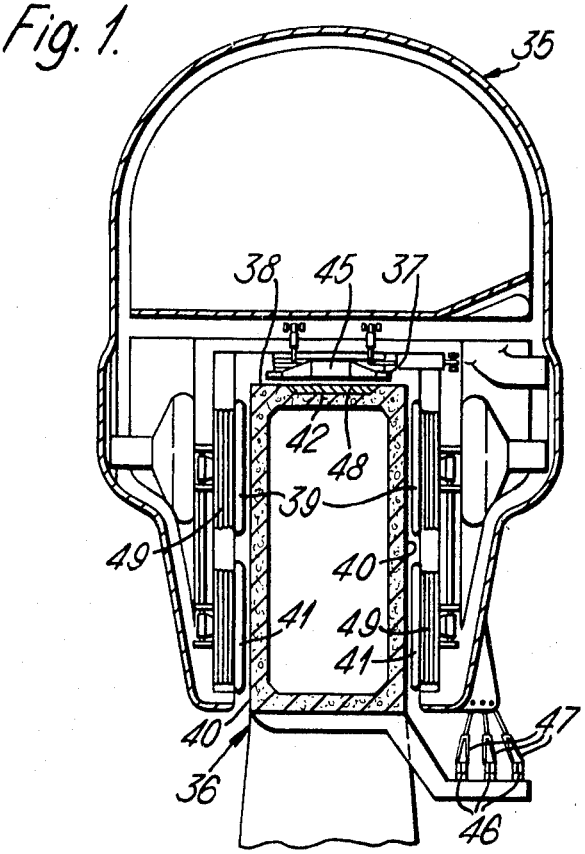

United States Patent
English

[15] 3,667,398
[45] June 6, 1972

[54] LINEAR INDUCTION MOTOR SECONDARY MEMBER

[72] Inventor: Christopher Durrant English, Burwell, England

[73] Assignee: Tracked Hovercraft Limited, London, England

[22] Filed: June 25, 1971

[21] Appl. No.: 156,625

[30] Foreign Application Priority Data

June 26, 1970  Great Britain......................31,143/70

[52] U.S. Cl. .........................................104/148 LM, 310/13
[51] Int. Cl. .......................................................H02k 41/04
[58] Field of Search ................................104/148, 148 LM; 310/12–14

[56] References Cited

UNITED STATES PATENTS

| | | | |
|---|---|---|---|
| 3,612,395 | 10/1971 | English | 310/12 X |
| 3,577,928 | 5/1971 | Victorri | 104/148 LM |
| 3,516,364 | 6/1970 | Machefert-Tassin | 310/13 X |
| 3,585,939 | 6/1971 | Laithwaite | 310/13 |

Primary Examiner—D. F. Duggan
Attorney—Cameron, Kerkam & Sutton

[57] ABSTRACT

The secondary member in or for a linear induction motor of the single-sided and short stator variety is mounted generally horizontally for co-operation with a linear induction motor primary member carried above it. The secondary member comprises an aluminum reaction plate disposed above magnetic material which supports it from the track. The reaction plate is wider than the magnetic material and extends beyond it along either side of the secondary member at side portions which in operation provide the longitudinally extending parts of the current paths in the reaction plate. The reaction plate is clamped down on to the track by clamping devices which produce clamping forces on the undersides of the side portions immediately adjacent the magnetic material.

14 Claims, 7 Drawing Figures

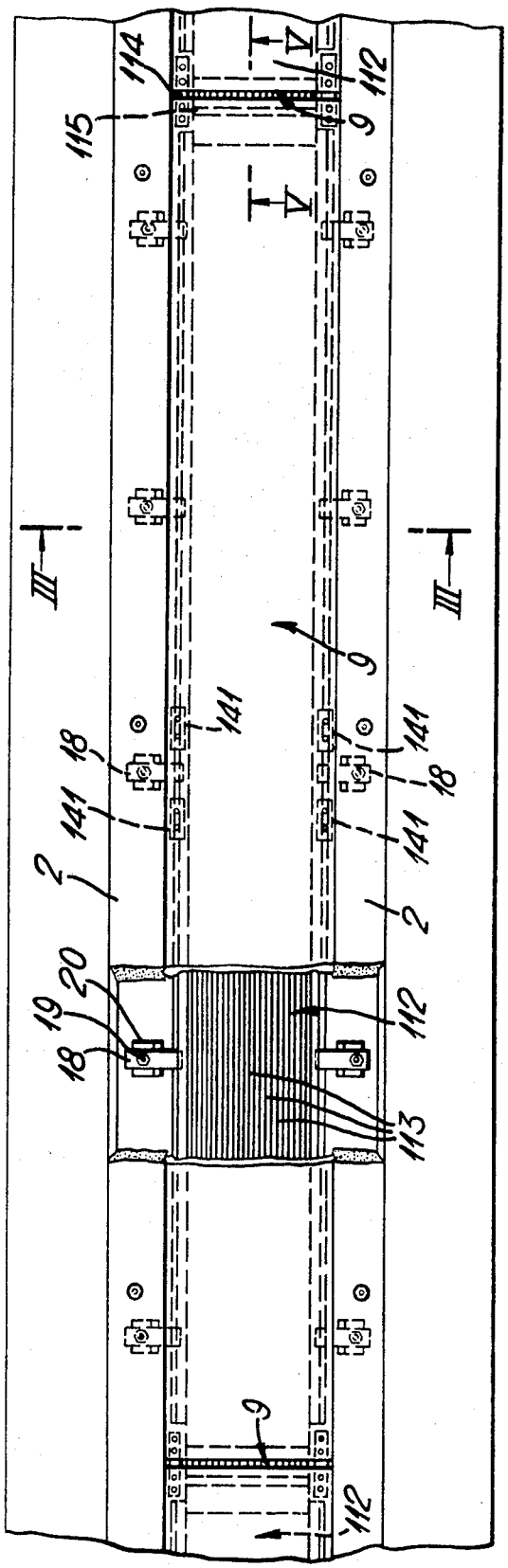

LINEAR INDUCTION MOTOR SECONDARY MEMBER

This invention concerns the secondary of "rotor" member for a single-sided linear induction motor, that is to say, a linear induction motor in which the primary or "stator" member which carries the energizing windings is arranged on one side only of the secondary member. The secondary member comprises a reaction plate of electrically conductive and preferably non-magnetic material which is backed by magnetic backing material. The primary member is arranged to produce a longitudinally travelling magnetic field, and in operation flux due to this field passes through the reaction plate to magnetic material and from the magnetic material returns to the primary member. The interaction of the flux with currents which it induces in the reaction plate creates propulsive force which is directed longitudinally of the motor.

In particular, the invention relates to secondary members for single-sided linear induction motors in which the reaction plate has side portions for providing low resistance current paths along each side of the secondary member beyond the magnetic material. The side portions overhang the side edges of the magnetic material, and, because for low self-inductance the low resistance paths should be clear of the magnetic material, they are formed generally in the same plane as the part of the reaction plate overlying the magnetic material.

One of the most important applications of single-sided linear induction motors is a vehicle propulsion in transportation systems in which vehicles are arranged to operate along a prepared track. In such an application each vehicle may be provided with a primary member as described above, for co-operation with a secondary member which extends along the track. The reverse "short rotor," arrangement is possible, i.e., the vehicles may each carry a secondary member for co-operation with a wound primary member extending along the track, but it is with the former type of system hereinafter to be referred to as a "short stator" system, that the present invention is concerned.

One of the major items of cost in a transportation system using linear induction motor propulsion lies in the part of the motor carried by the track — this is a primary reason why a "short rotor" system is not usually adopted — and it is therefore highly desirable in a "short stator" system that the secondary member should be cheap and easy to install and maintain. It is an object of the present invention to provide such a secondary member for a linear induction motor in a "short stator" system.

According to one aspect of the invention there is provided, in combination, a prepared track and a generally horizontal linear induction motor secondary member extending along the track for co-operation with a single-sided linear induction motor primary member carried above it by a vehicle arranged for operation along the track whereby to propel the vehicle, the linear induction motor secondary member comprising an electrically conductive reaction plate, magnetic material between the reaction plate and the track, the reaction plate being wider than the magnetic material so as along the sides of the secondary member to extend beyond the magnetic material in side portions for providing longitudinal paths for secondary member current, and clamping means for separate co-operation with the side portions and attached to the track to secure the reaction plate into position, the co-operation of the clamping means with the side portions being at the undersides of the side portions.

According to a second aspect of the invention there is provided the secondary member in or for a combination as described in the preceding paragraph.

Figure 3:
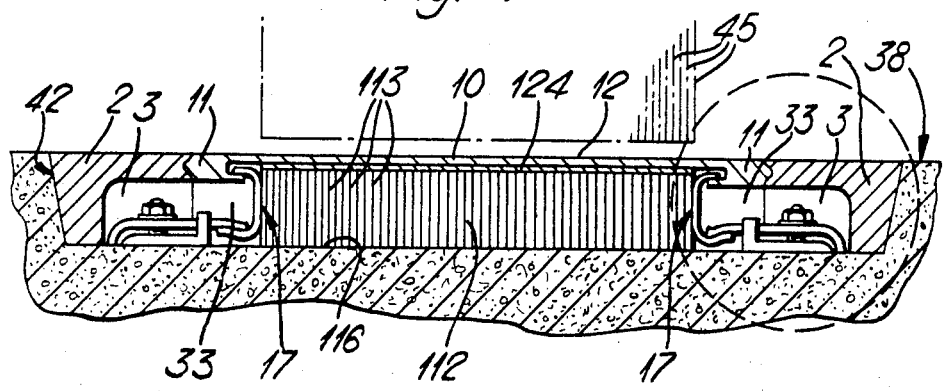
Figure 4:
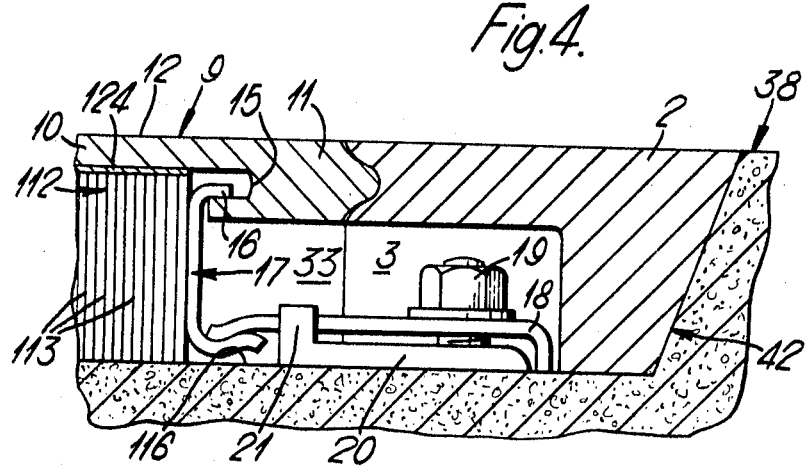
Figure 6:
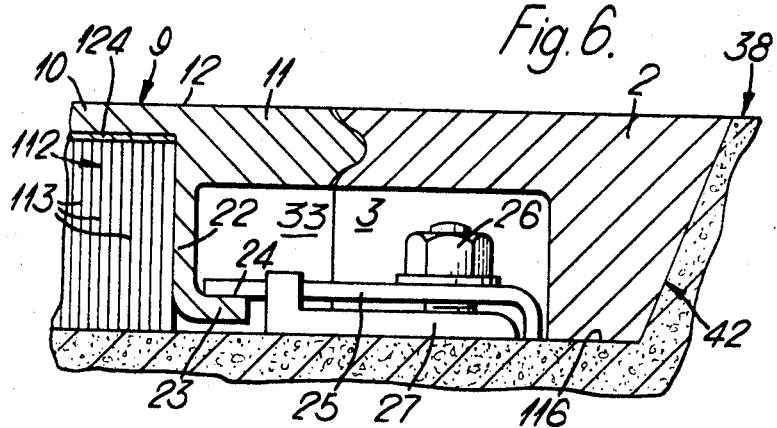
Figure 7:
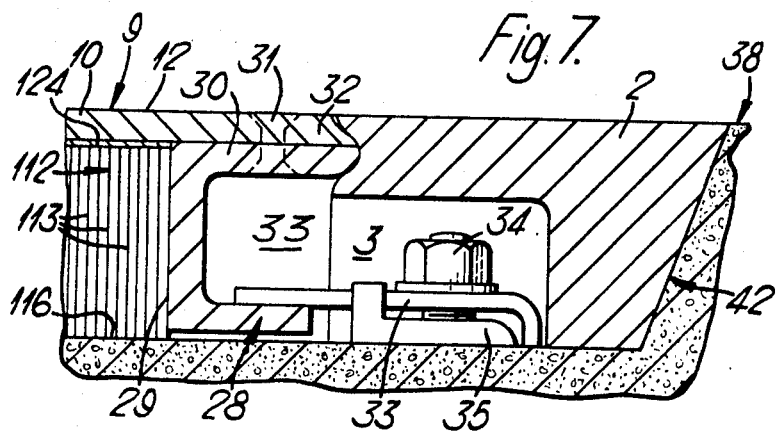
Figure 5:
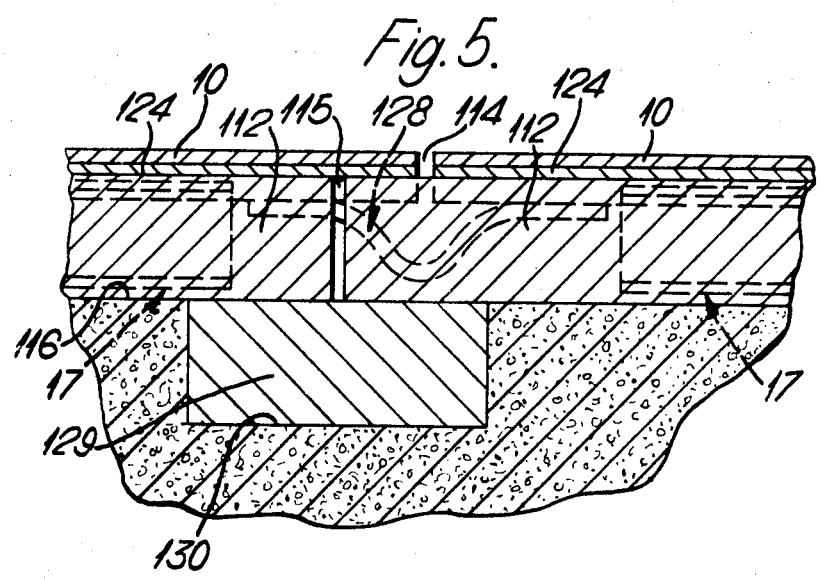

In order that the invention may be more fully understood, one embodiment of the invention and two modifications thereof will now be described, by way of example, with reference to the accompanying diagrammatic drawings, in which:

FIG. 1 shows a gas cushion vehicle arranged for operation along a prepared track and propelled by a linear induction motor of which the secondary member embodying the invention extends along the track, FIG. 2 shows a typical length of the track as seen from above, FIG. 3 is part of a sectional view taken on the line III — III of FIG. 2 showing the secondary member and its attachment to the track, FIG. 4 shows a detail of the secondary member, being an enlarged view of the general area circled in Figure 3, FIG. 5 shows a further detail of the secondary member, being part of a sectional view taken on the line V — V of FIG. 2, FIG. 6 shows, in a view corresponding to FIG. 4, the general area circled in FIG. 3 of the secondary member when in the first modification thereof, and FIG. 7 is a view similar to FIG. 6 showing the secondary member when in the second modification.

Referring now to FIG. 1 of the drawings, an air cushion vehicle 35 is supported for operation along an elevated concrete track 36 of generally rectangular cross-section by two longitudinally spaced air cushion support pads 37 (one of which is visible) co-operating with the horizontal top track surface 38 through the medium of cushions of air. Likewise the vehicle is guided along the track by two longitudinally spaced pairs of opposed air cushion guidance pads 39 co-operating with the vertical side track surfaces 40. Further air cushion pads 41 mounted beneath the guidance pads 39 of the rear pair also co-operate with the side surfaces 40 to provide stability against vehicle rolling motions due, for example, to side winds. The pads 37, 39 and 41 are each resiliently carried from the vehicle body by flexible bellows 49.

A linear induction motor is provided for propelling the vehicle along the track. The primary member 45 of this motor is carried centrally beneath the vehicle body and is conventionally formed with magnetic material and energizing windings (not separately shown) arranged to produce a longitudinally travelling field of magnetomotive force when energized with three-phase alternating current. This A.C. power is supplied from a trackside supply via static conductor rails 46 extending along the track and co-operating pick-up shoes 47 on the vehicle.

The secondary member of the induction motor, indicated in FIG. 1 by the reference numeral 48 only so far as its location is concerned, extends along the track 36 within a channel 42 centrally formed in the top of the track. FIGS. 2 – 5 show in detail the arrangement of the secondary member; from them, in particular from FIG. 2, it will be seen that the secondary member comprises a composite reaction plate formed of a plurality of (individual) aluminum reaction plates 9 arranged end-to-end along the track above magnetic material formed of stacks 112 of longitudinally extending, vertical magnetic laminations 113. The stacks 112 are also arranged end-to-end, being of the same length as the plates 9 and having the discontinuities 115 between them slightly offset from the discontinuities 114 between the plates 9.

As can be seen in FIG. 3 and to a larger scale in FIG. 4, each lamination stack 112 is of rectangular cross section and lies on the generally flat bottom 116 of the channel 42 centrally within the channel. In a modification a layer of resilient and non-adhesive material is interposed between each lamination stack and the bottom of the channel.

The reaction plates 9 are made of aluminum and are extruded. Each reaction plate has a central part 10 of generally constant thickness which overlies the magnetic material formed by the stacks 112, and two side portions 11 which project beyond the magnetic material along the sides of the secondary member and are made thicker than the central part 10, extending downwardly from the plane upper surface 12 of the reaction plate so as in the vertical sense to overlap part of the magnetic material.

A sheet 124 of a wear and heat resistant and electrically insulating material such as resin bonded asbestos paper is interposed between the central part 10 of each reaction plate and the underlying magnetic material. These sheets protect the lamination stacks from high temperatures which occur in the reaction plates during operation; they also prevent sparking between the reaction plates and the lamination stacks and prevent them from fretting when their opposed surfaces move across one another due to differential thermal expansion and contraction.

As can clearly be seen in FIG. 4, inwardly facing grooves 15 are formed in the vertical inside surfaces of the side portions 11 where they face the magnetic material; in these grooves are received respective upper arms 16 of two U-shaped channel members 17 which are made of spring steel and are arranged on their sides with their arms extending outwardly of the secondary member. In a modification the channel members are essentially rigid.

Each channel member extends approximately the length of the respective reaction plate and is secured to the track at intervals by resilient clamping devices 18 held down by bolts 19. Anti-rotation members 20 having upstanding arms 21 between which pass the clamping devices 18 serve to prevent any rotation of the devices 18 on the bolts 19 due to longitudinal movement of the channel members 17.

When the bolts 19 are fully tightened the channel members 17 exert a considerable downward force on the reaction plate 9 by abutting co-operation with the lower surfaces of the grooves 15. It will thus be seen that the lamination stacks 12 are clamped between the reaction plates 9 and the track and are therefore restrained from upward vertical movement together with the reaction plate. In addition, by abutting the sides of the lamination stacks 112, the channel members 17 serve to locate the stacks transversely of the track.

In order to offset the tendency for the reaction plates when in position to bow upwardly at their centers due to the downward clamping forces exerted at their side edges, the reaction plates before assembly are each initially formed with a slight bow which is convex to the magnetic material when the two are presented to one another. In the assembled track section this bow is substantially removed by the application of the clamping forces.

The discontinuities 114 and 115 between, respectively, the reaction plates and the lamination stacks constitute expansion gaps accommodating differential thermal expansion and contraction of those items relative to the track in its longitudinal direction. As can be seen in FIGS. 2 and 5, each gap 114 between successive reaction plates is bridged electrically by a pair of flexible braid connections 128 which connect the adjacent ends of the reaction plates together at the underside of the side portions 11, being welded or otherwise secured at their ends to the reaction plates.

FIG. 5 also shows one of the expansion gaps 115 between lamination stacks 112. The gap 115 is magnetically bridged by a short stack 129 formed of further ones of the magnetic laminations 113. The stack 129 is received in a well 130 specially provided in the bottom 116 of the channel, and underlies the ends of the adjacent stacks 112 separated by the gap 115.

The ends of the stacks 112 are slidable across the top face of the stack 129 beneath them and in this way differential thermal expansion and contraction in the longitudinal direction is accommodated while at all times maintaining magnetic continuity between the stacks 112.

Filler members 2 of suitable material are disposed in the channel 42 between the sides of the secondary member and the corresponding sides of the channel so as with the surfaces 12 and with the track at the sides of the channel to form the generally plane air cushion support surface 38. The members 2 are locally formed with cavities 3 for accommodating the clamping devices 18, bolts 19 and anti-rotation members 20.

For weather protection and/or (as appropriate) in order to prevent loss of support cushion pressure as the air cushion vehicle passes over them, the expansion gaps 114 and 115 and the cavities 133 (FIGS. 3 and 4) formed beneath the side portions 11 of the reaction plate are filled with sponge rubber, foamed plastic or other resilient and weather resistant material not shown in the drawings.

As is indicated in FIG. 2, each reaction plate 9 has its mid point (in the longitudinal direction) located with respect to the track by four location members 141. At its true mid point the reaction plate is clamped to the track by a pair of transversely aligned clamping devices 18, as previously described. The location members 141 are disposed immediately adjacent each side of these particular clamping devices 18 and are bolted to the respective side portion 11 and to the track so as to provide the desired longitudinal location.

In operation, with the primary member 45 supported at a small distance (e.g., 1 centimeter) above the secondary member as indicated in FIG. 3 by the ghosted lines, the field of magnetomotive force created is known manner by the primary member energizing windings drives flux around the longitudinally directed, vertical, low reluctance paths which are provided in combination by the magnetic material of the primary member and the stacks 112, 129 of the secondary member. This longitudinal flux in turn induces currents to flow in the reaction plates 9 in generally rectangular and horizontal flow paths corresponding to the magnetic poles of the travelling field, and the electromagnetic interaction of these currents with the originating flux produces propulsive force for driving the vehicle 35 along the track 36. Such production of propulsive force is known and therefore not described in detail.

The thrust exerted on the reaction plates in producing the propulsive force is reacted by the location members 141, together with any frictional forces involved at the engagement of the channel members 17 with the side portions 11 and, in series, at the engagement of the clamping devices 18 with the channel members 17. The members 141 also provide location for the centers of the reaction plates longitudinally of the track in order to ensure that thermal changes in relative length between the reaction plates and the track will be shared approximately equally between the gaps 114.

In this respect it will be noted that differential thermal expansion and contraction between each reaction plate 9 and the track both longitudinally and transversely of the motor is accommodated by sliding movement of the upper arms 16 of the channel members in the grooves 15 and/or by sliding movement of the lower arms of the channel members with respect to the clamping devices 18. Such sliding movement of each reaction plate in the longitudinal direction is in opposite senses from the plate center, the latter being located on the track by the location members 141. The location members themselves are made sufficiently flexible to allow the transverse movement of the reaction plate with respect to the track.

If desired, a layer of low friction material such as PTFE may be provided at one or both of the co-operating surfaces at each interface between the channel members 17 and the reaction plates 9 or the clamping devices 18. The low friction material facilitates sliding at the interface (which occurs in particular when the reaction plate is operative to produce propulsive force) and reduces or prevents electrolytic action at the interface.

The side portions 11 provide low resistance paths which are free of any substantial flux crossing the air gap between the primary and secondary members and in which can flow the longitudinally directed parts of the induced secondary member currents. The current flow in each reaction plate where it lies within the primary-secondary magnetic circuit can therefore be substantially transverse of the motor and therefore substantially fully effective to create propulsive force. The flexible connections 128 provide continuity for the longitudinally directed parts of the secondary member current paths while accommodating relative longitudinal movement of the ends of the reaction plates 9 to which they are connected.

During operation it may happen that the secondary member is subject to a net upward force by reason of the magnetic attraction to the primary member of the lamination stacks 112 and 129. Under such circumstances the net upward force is counteracted substantially wholly by the channel members 17 which restrain the magnetic material from upward movement by means of the reaction plates 9. The channel members 17 themselves are, of course, secured to the track by the clamping devices 18 and bolts 19.

In a variation of the arrangement shown in FIGS. 2 to 5 which enables rolled aluminum sheet to be used, the side portions 11 of the reaction plate are provided partly by overhanging portions integral and coplanar with the central part 10 and of the same thickness, and partly by strips of the same material bolted, or otherwise secured, to the undersides of the overhanging portions. The top surfaces of the strips are formed with longitudinally extending notches for providing the grooves 15.

FIG. 6 shows how the secondary member of FIGS. 2 to 5 can be modified so as to obviate the need for the channel sections 17. In addition to the thickened side portions 11 each reaction plate is formed at its sides with downwardly depending portions 22 and ledge portions 23 which are carried from the bottom of the portions 22 and which extend outwardly from the magnetic material generally in a horizontal plane, so as to provide continuous and generally horizontal upper surfaces 24. Resilient clamping devices 25 engage the surface 24 at intervals and are secured to the track by bolts 26 to provide the desired clamping action. They are prevented from rotation by anti-rotation members 27. The items 25, 26 and 27 can be identical to the corresponding items 18, 19, 20 of FIGS. 2 to 5.

FIG. 7 shows a further modification of the secondary member of FIGS. 2 to 5. Instead of being integrally formed with the thickened side portions 11 each reaction plate 9 is made of rolled sheet aluminum of constant thickness and overhangs the magnetic material by the desired amount on either side.

Two heavy section channel members 28 in the form of a U and each having the back of its web 29 abutting (and laterally locating) the magnetic material have their upper arms 30 bolted by bolts 31, or otherwise positively attached, to the underside of the overhanging portions 32 of the reaction plate. Each channel member is made of the same material as the reaction plate. The lower arm of each channel member 28 is engaged at its upper surface by members 33, 34, 35 analogous to the members 18, 19, 20 of FIGS. 2 to 5. It will be appreciated that low resistance paths for the sides of the rotor current paths are provided in combination by the overhanging portions 32 of the reaction plate and the upper arms 30 of the channel members 28.

In modifications of the arrangements shown in the drawings the lamination stacks are attached to the track in a way which allows for differential thermal expansion and contraction with respect to the track. Such attachment may be merely for locating the stacks longitudinally of the track at some point along their length, or it may be such as partly to restrain the lamination stacks from upward movement when subject to a net upward force caused by attraction to the primary member.

It will be noted that in all the described arrangements the composite reaction plate is secured in position by co-operation with the side portions provided for the longitudinally directed parts of the reaction plate currents at their undersides. This enables the moment arm of the clamping forces to be kept to a minimum because the clamping forces can be applied immediately adjacent the sides of the magnetic material as shown. Particular features of the described arrangements are that the clamping means for securing the reaction plates are operative at the edges of the side portions remote from the edges of the reaction plates and that they also serve to provide lateral location for the magnetic material.

Because the moment arm of the clamping forces is small, the clamping forces themselves can be large without an intolerable bending moment being imposed on the reaction plates. For this reason, in the described arrangements at least a substantial proportion of any net upward force due to attraction of the magnetic material to the primary member can be taken by the clamping means; the magnetic material can therefore be unattached to the track.

It will be appreciated that in the described arrangements there is no need for the expansion gaps 114 and 115 to be in the particular relative position shown; any relative position may be used. Likewise the lengths of the reaction plates and the lamination stacks may be chosen independently of one another.

In the described arrangements the expansion gaps 115 are bridged magnetically by the magnetic bridging members 129. It may be possible, however, to omit some or all of the bridging members if the expansion gaps between adjacent stacks are sufficiently small (or non-existent) or if the resulting disturbances of the primary member can be tolerated on the vehicle. A particular need for the bridging members 129 exists where the secondary member is required to span an expansion gap between long lengths of track, in which case a total movement of several inches may need to be accommodated.

In a modification of the described arrangements each lamination stack is positively located with respect to the track mid way along its length by bolting or the like.

The invention has been described in relation to singe-sided linear induction motors in which the flux passes in the motor in a longitudinal direction. The invention is not, however, limited to secondary members for this type of motor, but also includes within its scope secondary members for single-sided linear induction motors in which the motor flux is at least partly directed transversely of the motor. The magnetic backing material may then be formed of transversely orientated vertical laminations.

Although the invention has been described in relation to laminated magnetic backing material, the magnetic material may be solid or it may be a combination of solid and laminated material.

The invention is in no way limited to air cushion vehicle systems but may be applied to any transportation system in which vehicles are driven along a prepared track by a single-sided linear induction motor of which the secondary member extends along the track, the induction motor therefore being of the "short stator" variety.

I claim:

1. In combination a prepared track and a generally horizontal linear induction motor secondary member extending along the track for co-operation with a single-sided linear induction motor primary member carried above it by a vehicle arranged for operation along the track whereby to propel the vehicle, the linear induction motor secondary member comprising an electrically conductive reaction plate, magnetic material between the reaction plate and the track, the reaction plate being wider than the magnetic material so as along the sides of the secondary member to extend beyond the magnetic material in side portions for providing longitudinal paths for secondary member current, and clamping means for separate co-operation with the said side portions and attached to the track to secure the reaction plate into position, the co-operation of the clamping means with the side portions being at the undersides of the side portions.

2. In combination a prepared track and generally horizontal linear induction motor secondary member extending along the track for co-operation with a single-sided linear induction motor primary member carried above it by a vehicle arranged for operation along the track whereby to propel the vehicle, the linear induction motor secondary member comprising an electrically conductive reaction plate, magnetic material between the reaction plate and the track, the reaction plate being wider than the magnetic material so as along the sides of the secondary member to extend beyond the magnetic material in side portions for providing longitudinal paths for secondary member current, and clamping means for separate co-operation with the said side portions and attached to the track to secure the reaction plate into position, the co-operation of the clamping means with the side portions being at the undersides of the side portions remote from the edges of the reaction plate.

3. A combination according to claim 2, wherein the co-operation of the clamping means with the side portions is by abutment of co-operating surfaces.

4. A combination according to claim 1, wherein the side portions extend downwardly so as in the vertical sense to overlap part of the magnetic material, and the co-operation of the clamping means with the side portions is at the undersides of the side portions remote from the edges of the reaction plate.

5. A combination according to claim 4, wherein longitudinally extending grooves are formed along inside faces of the overlapping parts, and the clamping means have arms which extend into the grooves so as to bear downwardly upon the lower surfaces of the grooves in abutting relationship therewith, and downwardly extending portions which extend downwardly from the said arms for transmitting clamping forces thereto.

6. A combination according to claim 5, wherein the arms are slidable in the grooves for at least partly accommodating differential thermal expansion and contraction between the reaction plate and the track at least in the longitudinal direction.

7. A combination according to claim 4, wherein the clamping means comprises downwardly extending portions which extend downwardly from the side portions for transmitting clamping forces thereto and which are integral with the side portions.

8. A combination according to claim 4, wherein the reaction plate comprises a rolled sheet of electrically conductive material of generally uniform thickness which extends beyond the magnetic material on either side, the combination further comprising electrically conductive angled members having arms thereof secured in generally parallel and contiguous relation to the projecting parts along their undersides, the arms of the angled members and the projecting parts together forming the side portions, the angled members having downwardly extending portions which extend downwardly from the said arms for transmitting the clamping forces thereto.

9. A combination according to claim 2, wherein the clamping means comprise portions extending downwardly from the co-operation with the side portions and turned outwardly at their bases, and resilient members which bear downwardly upon the top surfaces of the said outwardly turned bases in abutting relation therewith and are secured to the track to produce clamping forces on the side portions.

10. A combination according to claim 2, wherein the magnetic material is formed of a plurality of blocks of magnetic material extending along the track with gaps between the adjacent ends of successive blocks for accommodating differential thermal expansion and contraction relative to the track, the combination including, for each said gap, a magnetic member disposed in overlapping relationship beneath the magnetic blocks forming the gap so as magnetically to bridge the gap, at least one of the magnetic blocks being arranged for longitudinal movement with respect to the magnetic member where they overlap one another.

11. A combination according to claim 2, which includes a sheet of resin bonded asbestos paper separating the reaction plate from the magnetic material.

12. A combination according to claim 2, wherein the secondary member is received in a channel formed in the track, and filler members are disposed in the channel between the side portions and the adjacent sides of the channel, the reaction plate including the side portions, the filler members, and the track at either side of the channel in combination presenting an upwardly facing and generally plane surface.

13. A combination according to claim 2, wherein by means of the reaction plate the clamping means are effective for counteracting substantially all of any net upward force which in operation may be exerted on the secondary member due to attraction of the magnetic material to the primary member.

14. The combination claimed in claim 1 when further combined with gas cushion vehicle arranged for operation along the track and carrying beneath it a linear induction motor primary member for co-operation with the said secondary member.

* * * * *